(12) United States Patent
Pang

(10) Patent No.: US 10,042,434 B2
(45) Date of Patent: Aug. 7, 2018

(54) LED CURRENT RAMPING METHOD FOR OPTICAL MOUSE

(71) Applicant: PixArt Imaging (Penang) SDN. BHD., Penang (MY)

(72) Inventor: Kwai Lee Pang, Penang (MY)

(73) Assignee: PixArt Imaging (Penang) SDN. BHD., Penang (MY)

(*) Notice: Subject to any disclaimer, the term of this patent is extended or adjusted under 35 U.S.C. 154(b) by 0 days.

(21) Appl. No.: 15/382,750

(22) Filed: Dec. 19, 2016

(65) Prior Publication Data

US 2018/0173324 A1 Jun. 21, 2018

(51) Int. Cl.
- *G09G 5/00* (2006.01)
- *G06F 3/03* (2006.01)
- *G09G 3/32* (2016.01)
- *G06F 1/32* (2006.01)

(52) U.S. Cl.
CPC .......... *G06F 3/0312* (2013.01); *G06F 1/3259* (2013.01); *G09G 3/32* (2013.01); *G09G 2310/066* (2013.01)

(58) Field of Classification Search
CPC .. G06F 3/0317; G06F 3/0383; G06F 3/03543; G06F 3/038; G06F 1/3231; G06F 3/0354; G06F 3/03541; G06F 3/0421; G06F 3/044; G06F 1/169; G06F 21/83; G06F 3/0312; G06F 3/033; G06F 3/0304; G06F 3/0338; G06F 3/0346; G06F 3/01; G06F 3/042; G09G 5/08; G09G 5/34
USPC ................................. 345/163, 166
See application file for complete search history.

(56) References Cited

U.S. PATENT DOCUMENTS

2005/0195169 A1* 9/2005 Lin ........... G06F 3/0317
345/163
2014/0210723 A1* 7/2014 Lin ........... G06F 3/0317
345/166

* cited by examiner

*Primary Examiner* — Duc Q Dinh
(74) *Attorney, Agent, or Firm* — Winston Hsu

(57) ABSTRACT

An LED current ramping method for an optical mouse includes: determining a speed of the optical mouse; setting control bits according to the determined speed; sending the control bits to a digital circuit of the mouse; and decoding the control bits to selectively open and close switches in a constant current LED driver of the mouse to adjust a current according to the speed.

4 Claims, 3 Drawing Sheets

LED current setting (mA) vs speed (ips)

LED CURRENT RAMPING METHOD FOR OPTICAL MOUSE

BACKGROUND OF THE INVENTION

1. Field of the Invention

This invention relates to an optical mouse, and more particularly, a current ramping method to control power of an optical mouse LED.

2. Description of the Prior Art

In a standard optical mouse, a current setting for an LED of the optical mouse remains constant across all speeds. This does not accurately reflect the needs of the mouse, however. At high speeds, an increased LED setting can reduce image blurring and pre-flash time, therefore meeting standards required at these particular levels.

As the above issues do not become apparent at low speeds, it is not necessary to maintain a high LED current all the time. Doing so will increase the power consumption of the mouse.

SUMMARY OF THE INVENTION

This in mind, it is an objective of the present invention to introduce a speed-related current setting of a mouse LED which can reduce power consumption, particularly at lower speeds.

An LED current ramping method for an optical mouse comprises: determining a speed of the optical mouse; setting control bits according to the determined speed; sending the control bits to a digital circuit of the mouse; and decoding the control bits to selectively open and close switches in a constant current LED driver of the mouse to adjust a current according to the speed.

These and other objectives of the present invention will no doubt become obvious to those of ordinary skill in the art after reading the following detailed description of the preferred embodiment that is illustrated in the various figures and drawings.

DETAILED DESCRIPTION

The present invention aims to provide a speed-controlled LED setting which will seamlessly step up or down the LED current for an optical mouse sensor.

Figure 1:
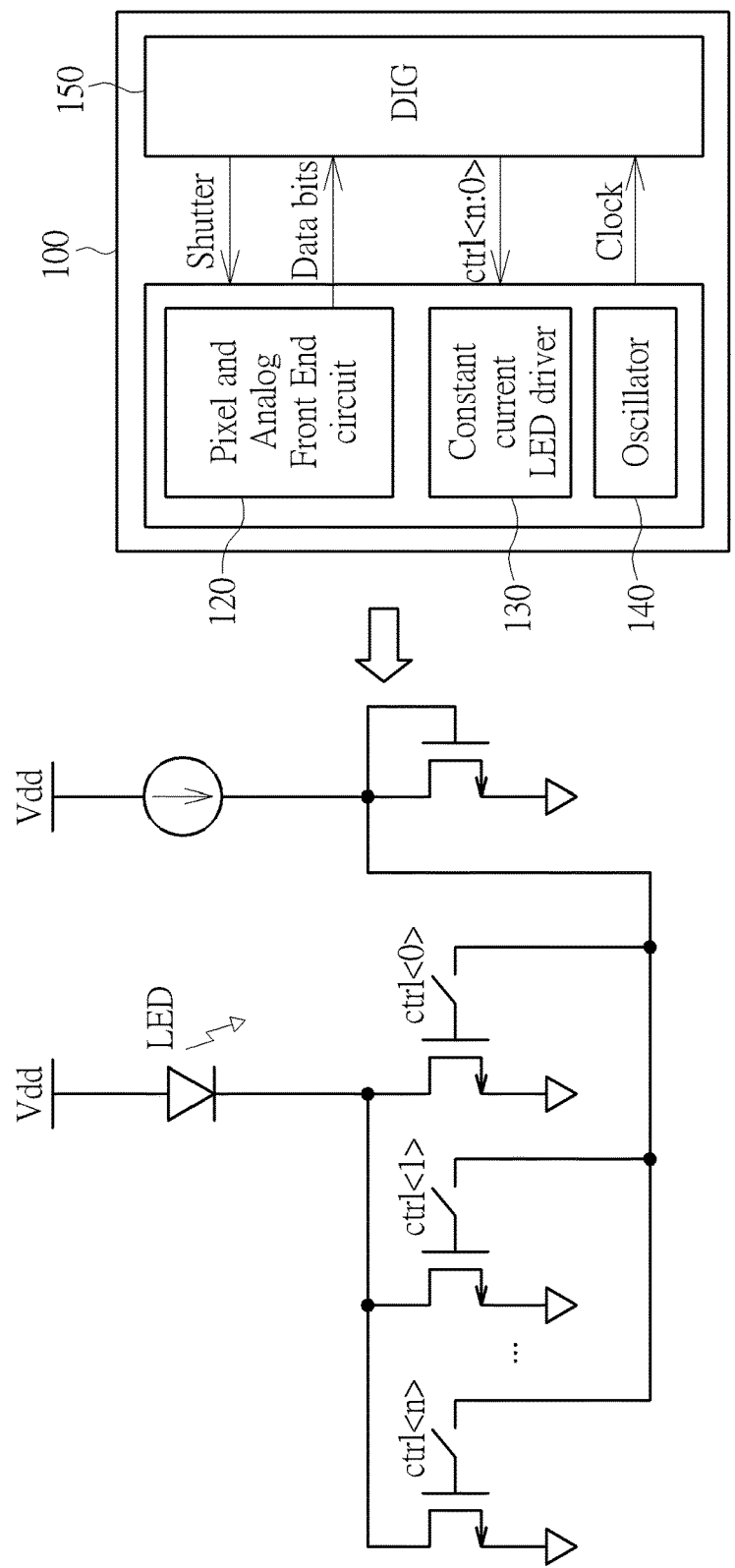
FIG. 1 is an illustration of an optical mouse sensor according to an exemplary embodiment of the present invention.

Refer to FIG. 1, which is an illustration of an optical mouse sensor 100 according to an exemplary embodiment of the present invention. The right hand side of the diagram is a block diagram showing the main functional blocks of the optical mouse sensor 100 and the left hand side of the diagram shows the circuit structure of a constant current LED driver 130 in the optical mouse sensor 100. The optical mouse sensor 100 comprises a pixel and analog front-end circuit 120, which also includes an amplifier and analog-to-digital (ADC) circuit, both of which are not shown. The optical mouse sensor further includes a constant current LED driver 130 and an oscillator 140. A digital circuit (denoted by "DIG") 150 exchanges signals with the above circuits. The digital circuit 150 informs the pixel and analog front end circuit 120 of the shutter speed of the optical mouse, and receives signals from the pixel and analog front end circuit 120 comprising a number of data bits. The digital circuit 150 defines and decodes the frame rate. The oscillator 140 informs the digital circuit 150 of the clock rate.

The digital circuit 150 can send a control signal to the constant current LED driver 130. In the prior art, the current setting will not vary with speed. Therefore there are available bits on the control signal ctrl<n:0>, which can be used to change the current setting. As shown in the circuit level diagram, the control bits are used to open and close switches within the LED driver 130, so that the current supplied to the LED can be varied. The particular bits selected on the control signal are decoded by the digital circuit 150 according to speed and frame rate threshold.

Please refer to Table 1 below, which shows example figures for varying LED current settings in accordance with speed and frame rate of the optical mouse sensor.

TABLE 1

| Speed | Frame rate, fps | Minimum frame period (us) | Ctrl<n:0> | LED current setting (mA) | LED ON pulse width (us) |
| --- | --- | --- | --- | --- | --- |
| <40 ips | <1,000 | 1000 | 0000, 0100 | 4 | 88 |
| 40-100 ips | 1,000-4,000 | 250 | 0000, 1000 | 8 | 64 |
| 101-200 ips | 4,001-7,500 | 133 | 0001, 0000 | 12 | 52 |
| 201-400 ips | 7,501-15,000 | 67 | 0001, 1010 | 26 | 41 |

Figure 2:
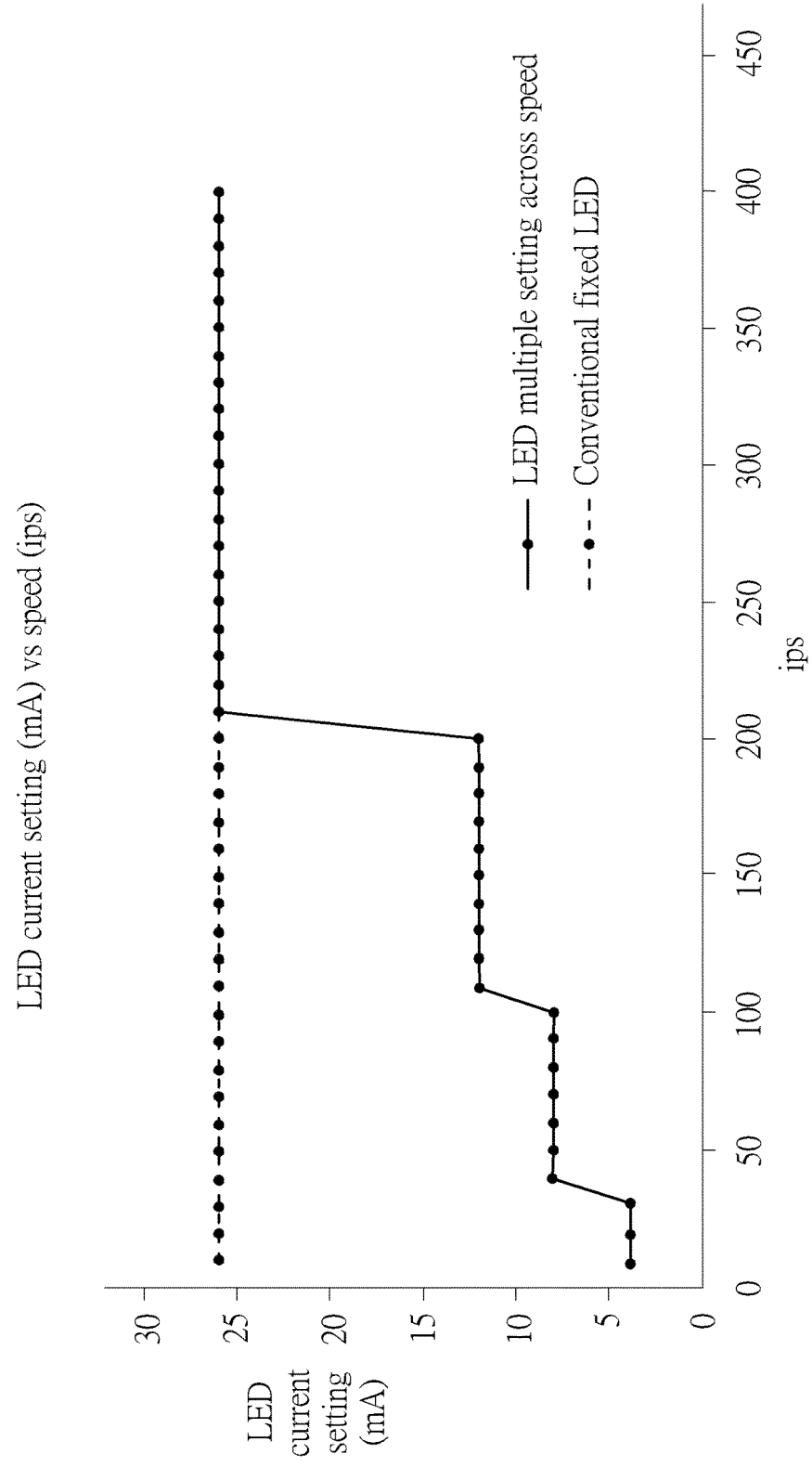
FIG. 2 is a graph illustrating an LED current setting vs. ips for both the present invention and the prior art.

Refer to FIG. 2, which illustrates the above values graphically for current setting vs. speed. As shown in the graph, the conventional LED will have a constant current setting no matter what the speed is. In the present invention, the current setting is ramped up according to the speed. At lower speeds, there are looser requirements for frame period and speed performance, and decent mouse tracking can still be achieved at a low LED current setting. Please note that the pulse width is extended slightly at the lower current settings (88 us for a current setting of 4 mA). At the higher speeds, i.e. when the frame rate is 15,000 fps or more, the minimum frame period is 67 us, during which the sensor has to complete image acquisition with an image which is sharp enough to enable proper tracking at these higher speeds. The LED current must therefore be increased to the maximum setting.

As detailed in the summary, the advantage of this ramping of LED current according to speed is that significant power saving can be achieved. Please refer to Table 2 below, which illustrates power saving compared to the conventional art at different speed and corresponding current settings.

| Speed | LED current setting (mA) | Invention average LED power (mW) | Conventional average LED power (mW) | % power saving |
| --- | --- | --- | --- | --- |
| <40 ips | 4 | 0.48 | 2.07 | 77% |
| 41-100 ips | 8 | 3.64 | 11.42 | 68% |

-continued

| Speed | LED current setting (mA) | Invention average LED power (mW) | Conventional average LED power (mW) | % power saving |
|---|---|---|---|---|
| 101-200 ips | 12 | 8.19 | 13.98 | 41% |
| 201-400 ips | 26 | 28.66 | 28.66 | 0% |

Figure 3:
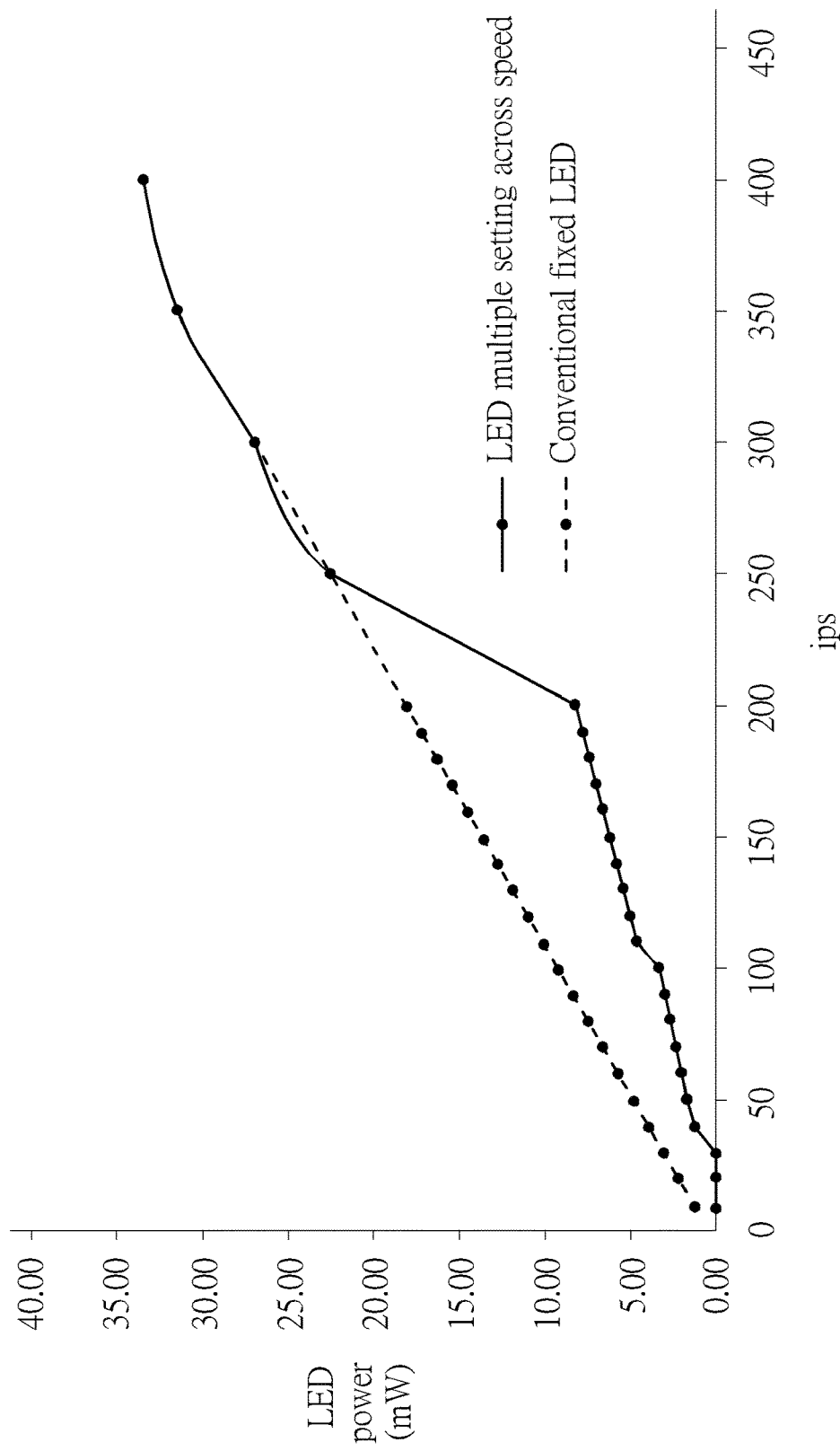
FIG. 3 is a graph illustrating LED power vs. ips for both the present invention and the prior art.

Refer to FIG. 3, which illustrates the above values graphically for average LED power vs. speed. As shown in the graph, the conventional LED will have a constant increase whereas the invention will increase in steps until about 250 ips, at which point the slope of average power vs. speed is the same as the conventional LED.

It should be noted that the ramping up in 4 stages is provided here as an illustration of the method of the present invention. In practise, the invention is not restricted to the number of current ramping stages. Further, although the graphs illustrate gradual implementation of the increased current with respect to speed, it is possible to implement an instantaneous step, i.e. where a mouse is initially moved at a speed less than 40 ips and then suddenly increases to over 400 ips. The implementation of this instantaneous change is only restricted by the limitations of the digital algorithm for adjusting the LED current with changes in parameters.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An LED constant current ramping method for an optical mouse, the method comprising:
    determining a speed of the optical mouse;
    setting control bits according to the determined speed;
    sending the control bits to a digital circuit of the mouse;
    decoding the control bits to selectively open and close switches in a constant current LED driver of the mouse to adjust a constant current supplied to an LED of the mouse according to the speed; and
    wherein the constant current is low at low speed and ramped up at higher speeds.

2. The LED constant current ramping method of claim 1, wherein the current is ramped up in four stages.

3. The LED constant current ramping method of claim 1, wherein the current can be ramped up to a highest level in a single stage.

4. The LED current constant ramping method of claim 1, wherein the step of decoding the control bits is further according to a frame rate threshold.

* * * * *